N. BENDIXEN.
MEANS FOR MOLDING POWDERED SUBSTANCES.
APPLICATION FILED MAR. 5, 1919.
1,309,112.
Patented July 8, 1919.
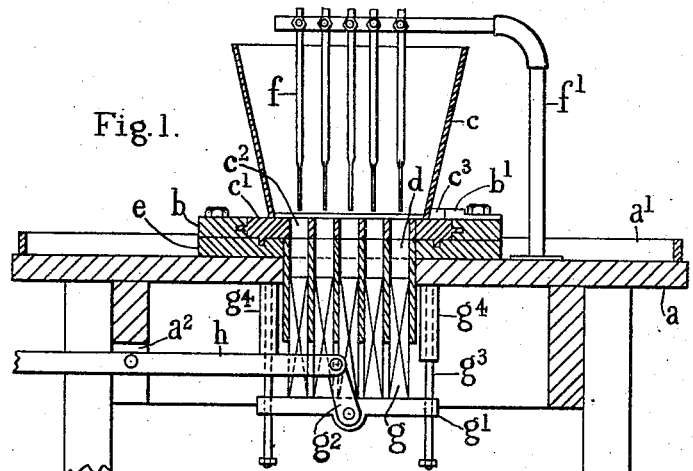
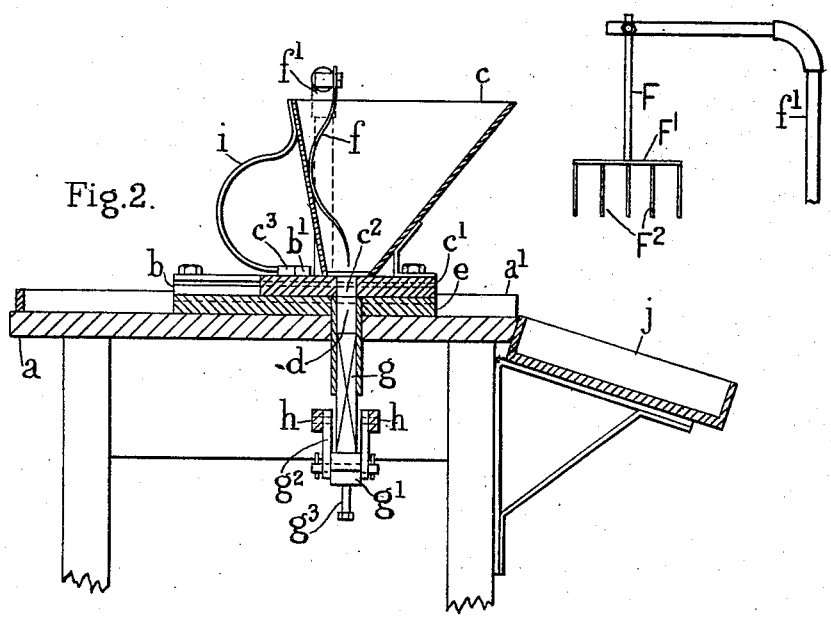
Inventor
Niels Bendixen,
By Singleton

UNITED STATES PATENT OFFICE.

NIELS BENDIXEN, OF HIGH HOLBORN, LONDON, ENGLAND.

MEANS FOR MOLDING POWDERED SUBSTANCES.

1,309,112.  Specification of Letters Patent.  Patented July 8, 1919.

Application filed March 5, 1919. Serial No. 280,829.

*To all whom it may concern:*

Be it known that I, NIELS BENDIXEN, a subject of the King of Denmark, residing at High Holborn, in the county of London, England, have invented certain new and useful Improvements in Means for Molding Powdered Substances, of which the following is a full, clear, and exact description.

In machines for molding or compressing powdered substances in which the powder is fed to the molds by means of a hopper it has been proposed to employ within the hopper vertical wires, strips or rods of metal with their lower ends in close proximity to the molds, and to give to such wires, strips or rods of metal an up and down motion. In other molding machines it has been proposed to employ a series of parallel horizontal wires in the charging device and to give the said wires a reciprocating movement in a horizontal plane.

When molding or compressing some powdered substances which readily adhere under pressure such as dried eggs it has been found that some forms of vibrating devices in the feeding hopper are actually detrimental as they cause the material to adhere and form lumps within the hopper and other devices when acting upon mixtures of substances of different specific gravities have a tendency to cause the heavier material in the mixture to fall to the lower part of the hopper and separate from the lighter material.

The object of the present invention is to provide a machine which will insure all the molds being equally filled and will not cause the heavier material in a mixture to fall to the lower part of the hopper and separate from the lighter material.

According to the present invention each vibrator is in the form of a spring arm of narrow cross section which is fixed at its upper end and is reciprocated almost horizontally at its lower end which is in close proximity to the mouth of the mold. In some cases I may employ a single spring arm fixed at its upper end and carrying at its lower end separate extensions or vibrators for each mold, each extension or vibrator having a narrow cross section and reciprocating practically horizontally at its lower end in close proximity to the mouth of a mold.

One method of carrying the invention into effect is illustrated in the accompanying drawings in which Figure 1 is a transverse section of a molding machine taken through the hopper and molds and Fig. 2 is a longitudinal section of the same machine also taken through the hopper and molds.

Fig. 3 is a front elevation of a modified form of vibrator to that shown in Figs. 1 and 2.

The vibrator or vibrators may be operated mechanically, as by a sliding hopper coming into contact therewith when the hopper is in position to deliver the material to the molds or molds.

As shown in the drawings the machine consists of a table $a$ having a raised edge $a'$ on three sides thereof and guides $b$ upon its upper surface in which is mounted a sliding hopper $c$. This latter is carried by a plate $c'$ having apertures $c^2$ through which the material is delivered to a series of molds $d$ the upper edges of which are flush with a plate $e$ over which the plate $c'$ slides. A stop $b'$ is fixed on one of the guides $b$ against which acts a projection $c^3$ on the plate $e$ to limit the motion of the hopper $c$ when it is in position to deliver the material to the molds. The front part of the sliding plate $c'$ acts as a cover for the molds $d$. Each mold is provided with a spring arm or vibrator $f$ which is bent rearwardly so that the upper or middle part of it comes into contact with the hopper $c$ as this latter moves forward and approaches or arrives at the position to deliver the material. The lower part of the spring arm or vibrator $f$ will consequently have more motion than its upper part within the material to be compressed. Owing to the smaller motion of this upper part, and owing to its narrow width, it will have little or no tendency to compress the material in front of it. The spring arms $f$ may be conveniently fixed at their upper ends to a bent arm or bracket $f'$ carried by the upper surface of the table $a$. Each mold $d$ contains a vertically moving plunger $g$ and the plungers are all connected at their lower ends by the bar $g'$. A bifurcated lever $h$ operated by hand is pivoted to a part $a^2$ of the table $a$ and the inner end of the lever is connected to the end bar $g'$ by a link $g^2$. The bar $g'$ slides upon the rods $g^3$ carried by the table $a$ and each rod $g^3$ is provided with a sleeve $g^4$ which acts as a stop for the bar $g'$ so that the plungers $g$ cannot be caused to project above the upper surfaces of the molds $d$.

$i$ is a handle fixed to the hopper $c$ and plate $c'$ by which the hopper is moved forward and backward. $j$ is a tray to receive the molded cakes. Instead of employing separate spring vibrators $f$ for each mold $d$ as shown in Fig. 1, I may employ a single vibrating arm F having a narrow cross rod F' carrying separate extensions or vibrators $F^2$ in close proximity to the mouths of the molds $d$. The vibrating arm F will be operated as hereinbefore described.

The operation of the machine is as follows:

The hopper $c$ is caused to slide a few times over the molds $d$ and it operates the vibrators $f$ at each forward movement. The molds $d$ being filled the hopper $c$ is pulled back until the front part of the sliding plate $c'$ covers the molds $d$. The plungers $g$ are then raised by means of the hand lever $h$ and the material is compressed. The hopper $c$ is then pulled farther back, opening the molds $d$, and the plungers $g$ are raised to lift the cakes clear of the molds $d$. The hopper $c$ is then pushed forward and the front edge of the sliding plate $c'$ pushes the cakes away from the molds $d$ onto the table $a$ or into a tray $j$ placed to receive them.

What I claim as my invention is:—

1. In means for molding powdered substances the combination of a sliding hopper having apertures in its lower part, a plurality of molds over which such hopper slides, spring arms of narrow cross section located within the hopper such spring arms being fixed at their upper ends and vibrating almost horizontally at their lower ends adjacent to the molds and means for causing the spring arms to vibrate substantially as set forth.

2. In means for molding powdered substances the combination of a sliding hopper having apertures in its lower part, a plurality of molds over which the hopper slides and curved spring arms of narrow cross section located within the hopper with which arms the hopper comes in contact when it approaches the position to deliver the powdered substance to the molds substantially as set forth.

3. In means for molding powdered substances the combination of a table, molds carried by said table, guides carried by said table, a plate sliding in said guides and having apertures therein corresponding with the molds, spring arms of narrow cross section located within the hopper and with which the hopper comes in contact in its forward motion, such spring arms being fixed at their upper ends and vibrating almost horizontally at their lower ends adjacent to the molds substantially as set forth.

4. In means for molding powdered substances the combination of a sliding hopper having apertures in its lower part, a table on which said hopper slides, a plurality of molds carried by said table, a bracket carried by said table, and a plurality of spring arms of narrow cross section fixed at their upper ends to said bracket and vibrating almost horizontally at their lower ends adjacent to the molds substantially as set forth.

5. In means for molding powdered substances the combination of a table, a fixed plate carried by said table, molds carried by said fixed plate, a sliding plate having apertures corresponding with the molds, guides for said sliding plate, a hopper carried by the sliding plate, a bracket carried by said table and a plurality of spring arms of narrow cross section fixed at their upper ends to said bracket and located within said hopper so that the hopper makes contact with the spring arms in its forward motion substantially as set forth.

6. In means for molding powdered substances the combination of a table, a hopper sliding on said table and having apertures in its lower part, molds carried by said table, plungers acting in said molds, a bracket carried by said table and a plurality of spring arms of narrow cross section fixed at their upper ends to said bracket and vibrating almost horizontally at their lower ends adjacent to the molds substantially as set forth.

In witness whereof I have hereunto set my hand.

NIELS BENDIXEN.

Copies of this patent may be obtained for five cents each, by addressing the "Commissioner of Patents, Washington, D. C."